United States Patent
Baehrle-Miller et al.

(10) Patent No.: US 10,160,434 B2
(45) Date of Patent: Dec. 25, 2018

(54) BRAKE DEVICE FOR A MOTOR VEHICLE AND METHOD FOR THE DETECTION OF DAMAGE TO THE BRAKE DEVICE

(71) Applicant: Robert Bosch GmbH, Stuttgart (DE)

(72) Inventors: Frank Baehrle-Miller, Schoenaich (DE); Tobias Putzer, Bad Friedrichshall (DE)

(73) Assignee: Robert Bosch GmbH, Stuttgart (DE)

( * ) Notice: Subject to any disclaimer, the term of this patent is extended or adjusted under 35 U.S.C. 154(b) by 20 days.

(21) Appl. No.: 15/153,237

(22) Filed: May 12, 2016

(65) Prior Publication Data
US 2016/0339897 A1    Nov. 24, 2016

(30) Foreign Application Priority Data

May 22, 2015   (DE) .................. 10 2015 209 480

(51) Int. Cl.
*B60T 17/22*   (2006.01)
*B60T 8/88*   (2006.01)
*B60T 13/74*   (2006.01)

(52) U.S. Cl.
CPC ............ *B60T 17/221* (2013.01); *B60T 8/885* (2013.01); *B60T 13/741* (2013.01); *B60T 2201/10* (2013.01); *B60T 2270/40* (2013.01); *B60T 2270/406* (2013.01)

(58) Field of Classification Search
CPC ........ B60T 7/107; B60T 17/221; B60T 11/06; B60T 8/174; B60T 8/885; B60T 13/588; B60T 13/741; B60T 13/746; B60T 2201/10; B60T 2270/40; B60T 2270/406
USPC ...................................... 303/10, 20
See application file for complete search history.

(56) References Cited

U.S. PATENT DOCUMENTS

| | | | | |
|---|---|---|---|---|
| 2004/0201270 | A1* | 10/2004 | Suzuki ................. | B60T 13/741 303/20 |
| 2005/0029858 | A1* | 2/2005 | Forster ................. | B60T 13/741 303/20 |
| 2005/0077783 | A1* | 4/2005 | Suzuki .................. | B60T 7/107 303/89 |

(Continued)

FOREIGN PATENT DOCUMENTS

DE          199 33 962 A1    2/2001
DE     10 2004 046 869 A1    4/2006

*Primary Examiner* — Robert A. Siconolfi
*Assistant Examiner* — San M Aung
(74) *Attorney, Agent, or Firm* — Maginot, Moore & Beck LLP (57) ABSTRACT

A method for determining defects of an automated parking brake for a motor vehicle with at least one brake device includes detecting damage to the parking brake on the basis of a time profile of a variable representing an output torque of a parking brake actuator. The parking brake includes the parking brake actuator configured to be activated. The detection of the damage includes analyzing the time profile of the variable representing the output torque of the parking brake actuator during a first phase of an activation process of the parking brake for the identification. The activation process of the parking brake has at least two phases. A first phase of the activation process includes a no build up or reduction of a clamping force between at least one brake lining and a brake disk. A second phase includes a build up or reduction of the clamping force.

5 Claims, 7 Drawing Sheets

(56) References Cited

U.S. PATENT DOCUMENTS

2007/0114843 A1\* 5/2007 Kawahara ................ B60T 7/12
303/122

\* cited by examiner

BRAKE DEVICE FOR A MOTOR VEHICLE AND METHOD FOR THE DETECTION OF DAMAGE TO THE BRAKE DEVICE

This application claims priority under 35 U.S.C. § 119 to patent application no. DE 10 2015 209 480.4 filed on May 22, 2015 in Germany, the disclosure of which is incorporated herein by reference in its entirety.

This disclosure relates to a method and a device for checking the operation of an automated brake device and in particular for checking the operation of an automated parking brake that is in the form of an electrohydraulic parking brake.

BACKGROUND

For example, the document DE102004046869A1 is known from the prior art. Said document describes a method and a device for checking the operation of an automated brake device and in particular for checking the operation of an automated parking brake that is in the form of an electrohydraulic parking brake. It is described herein that the check as to whether the spindle can move in the parking brake setting of the brake device can be carried out in this case by means of a sensor that detects a displacement of the spindle or by detecting a recorded motor current of the spindle drive.

Furthermore, the document DE19933962A1 is known from the prior art. Said document describes a device and a method for monitoring electromechanical clamping devices for vehicle brakes, wherein the electromechanical clamping device comprises the following: a drive that comprises an electric motor with a current feed, preferably a spring-loaded cylinder with a spring that can be tensioned by the drive for operating a tappet for clamping and releasing the vehicle brake. The monitoring device comprises a determining device for determining the current profile and/or voltage profile in the current feed, the output of which is connected to an analyzer that is designed to compare the determined current profile and/or voltage profile with previously stored target values and/or a previously stored target value characteristic.

SUMMARY

With a safety-related element such as a parking brake, it would be advantageous to identify damage in a timely manner, i.e. before the point in time at which the functionality of the parking brake is already affected, in order to be able to replace the damaged element promptly. For a reliable determination of any existing damage, it also seems purposeful that damage can be detected independently, i.e. regardless of previously stored target values or target value characteristics. Furthermore, a valid determination of damage should be carried out and incorrect messages about damage should be avoided.

A method is therefore provided for determining defects of an automated parking brake for a motor vehicle with at least one brake device, wherein the parking brake comprises a parking brake actuator that can be activated. According to the disclosure, the method is characterized in that the identification of damage to the parking brake is carried out based on a time profile of a variable representing the output torque of the parking brake actuator. One such method enables the timely identification of damage to a parking brake, wherein a reliable and valid determination of damage is also carried out.

A brake device shall in this context mean a combination of components that constitute the brake system of a wheel of the vehicle. The brake device thus comprises for example an inlet and an outlet for a brake fluid, a brake housing in the form of a brake caliper, as well as a brake piston. A brake system in this context can for example comprise a plurality of brake devices. Furthermore, on certain brake devices the motor vehicle can comprise an integration of a parking brake, which is implemented for example as a motor-on-caliper with a spindle driven by an electric motor. For example, there can be an integrated parking brake on each of the brake devices of the two wheels of the rear axle, whereas no parking brake is provided on the brake devices of the two wheels of the front axle.

A parking brake process is used in particular to secure the vehicle at a standstill. An automated parking brake (also known as an automated or automatic parking brake) undertakes the generation of the braking force or supports the driver in the generation of the braking force required for the parking process and enables the maintenance of the generated braking force. For this purpose, in a first step the required braking force on the brake device is adjusted and in a second step the generated braking force is determined. The magnitude of the required braking force depends on a plurality of factors, such as vehicle weight, gradient of the holding level or even the temperature of the brake disks. The braking force causes the brake linings to be pressed onto the brake disk by means of the brake piston; therefore, a clamping force can also be referred to. As a result, the braking force enables a holding force for holding the vehicle in the parked position. The parking brake comprises a parking brake actuator for the generation of the braking force. Said parking brake actuator can for example be in the form of a powerful electric motor of the parking brake. The parking brake comprises for example a self-locking mechanism for fixing the generated braking force. Said self-locking mechanism can be in the form of an electric motor with a spindle gear. Of course, the same electric motor can be used here.

The clamping force of the parking brake is applied and/or maintained by means of a system of a spindle nut and a threaded spindle. The threaded spindle is driven by a motor-gearbox unit for this purpose and acts on the bottom of a brake piston. The threaded spindle and the spindle nut mostly comprise a rotary end stop. Damage to the parking brake means in particular damage to the components of the parking brake: said radial stops are for example designed for a defined number of contacts. If said number is exceeded, a defect of the end stop can occur. Advantageously, in the event of timely detection of the damage, the worn parts can be renewed before the parking brake fails completely. The method detects and assesses for this purpose the profile of a variable representing the output torque of the parking brake actuator, in order in particular to identify local binding. An analysis of the anomalies also enables a classification of the damage. With the described method, a local defect of the stops of the spindle nut, or the stop of the spindle, the threaded spindle itself or the gearbox parts on the automated parking brake can be determined.

In an advantageous embodiment, the method is characterized in that the time profile of the variable representing the output torque of the parking brake actuator during a first phase of an activation process of the parking brake is analyzed for the identification of the damage, wherein an activation process of the parking brake comprises at least two phases, wherein in a first phase no clamping force is built up or reduced between at least one brake lining and a brake disk, and a clamping force is built up or reduced in a second phase.

It is understood here that the parking brake process comprises at least two phases. In a first phase, in particular during the activation of the parking brake actuator ("clamping the parking brake"), the free travel of the spindle and the clearance between the brake disk and the brake linings are reduced. In said phase, essentially no build-up of a braking force or holding force occurs. Once the free travel and the clearance have been overcome, a further activation of the parking brake actuator results in a build-up of force. This will be referred to as the second phase. For example, in a further third phase—such as already described—the clamping force that has built up can be locked. The presented description describes the activation process of the parking brake, i.e. the application of the parking brake. Furthermore, when releasing the brake two phases can also be assumed, wherein in one phase the clamping force of the parking brake actuator is reduced and in a further phase likewise no influence is exerted by or on the decrease of the force. Advantageously the method is used in the phase of the parking brake process in which no build-up or decrease of a braking force or clamping force occurs. By focusing on said phase, or by taking into account said condition, having to take into account corresponding force components or effects owing to the build-up or the decrease of the braking force can be avoided. For the displacement of the spindle, only a constant motor torque is required for overcoming the friction for example. Said phase can therefore be advantageously used for the analysis of further effects, such as for example damage that affects the output torque of the parking brake actuator.

By the use of further force-generating actuators, for example a hydraulic pump for the generation of a hydraulic pressure, the force-reducing phase can be carried out by said further actuator for example during a release process of the parking brake. In this case, the entire activation phase of the electric motor for returning the spindle nut of the parking brake could be analyzed in the sense of a first "zero force" phase.

In a further advantageous embodiment, the method is characterized in that the variable representing the output torque of the parking brake actuator is determined based on the determined current values of the parking brake actuator, wherein damage to the parking brake is detected if a change of the current value profile is determined, in particular if a positive current value change from a negative current value change is determined.

By this is meant that the identification of the damage to the parking brake is carried out on the basis of a time profile of the current value of the parking brake actuator. For this purpose, for example the current values of the electric motor are continuously determined or estimated. Said values are stored and a current value profile is derived therefrom. The use of the current values as a variable representing the output torque of the parking brake actuator is advantageously suitable, because said current values are simple to determine. Furthermore, there is a high degree of correlation between the profile of the output torque and the profile of the current values. Likewise, with one application the current values can be applied to existing systems for detection. As already described, in certain applications there is a constant motor torque demand, which results in an unchanged current value profile. A detected change of the current value profile can be advantageously used for the identification of damage. In order to validly identify local damage, the profile of the current value can be analyzed in detail. Besides the actual change of the current value profile, the series of changes would also be identified as a relevant indicator here. In this regard, it would in particular be detected that a positive current value change (i.e. an increase in current), which is followed by a negative current value change (i.e. a reduction in current value), is a valid indicator for the detection of local damage.

In an advantageous embodiment, the method is characterized in that damage is detected if the change of the current value profile is determined within a defined interval, in particular a time interval.

It is understood here that the quality of the result can be positively influenced by compliance with further—or even (compared to the sequence of changes) different—conditions. In particular, a relationship between the positive and the negative current value changes is to be observed. In order to reduce erroneous interpretations, it can be advantageously provided to only conclude that there is damage if both changes of the current values occur within a defined interval. A time span can be defined as the interval. The time that is required for a rotation of the spindle is named as an exemplary time interval; alternatively of course, other time intervals can be named. Alternatively, other intervals can be advantageously used, for example a specific rotation angle of the spindle.

In a further advantageous embodiment, the method is characterized in that the identification of damage is interrupted if an essentially simultaneous change of a voltage value profile is carried out with the current value profile.

It is understood here that—although for example the further defined conditions are fulfilled—it is not concluded that there is damage if there is a change of the voltage together with a change of the current value profile. This advantageously enables a possible erroneous interpretation to be avoided. A control function advantageously enables taking into account such a condition.

In an advantageous development, the method is further characterized in that the identification of damage is interrupted if a voltage value profile change is carried out in the same direction as the current value profile, in particular if a positive voltage change results in a positive current value change.

In particular, this enables the avoidance of a specific effect of the activation of the parking brake being falsely interpreted as damage. Said effect is as follows: if the electric motor of the parking brake has reached the idling speed and the voltage has increased to a minimum extent, then the electric motor is faster in said situation. At the same time, more current can flow, because the resistance remains constant ($U=R*I$). Although there is no damage or local binding, in the event of such a temporary voltage change the current profile would appear identical to a mechanical defect. In fact, however, said current profile is initiated purely electrically and not by a mechanical effect. By taking the condition into account, however, it is not concluded that there is damage in this case.

In a further advantageous embodiment, the method is characterized in that the identification of damage is interrupted if voltage changes are determined in the voltage value profile that lie above a defined threshold value.

It is understood here that when interrupting the identification of damage, only voltage changes that comprise a certain level should be taken into account. A small voltage variation often occurs during the activation of the parking brake. The identification of damage should not be affected by this, however. Therefore, a threshold value is advantageously defined from which it is assumed that there is an actual change of voltage. Very small voltage changes are as a rule not easily perceptible in the current signal, or can be defined so that the current changes that result in detection are not yet reached.

In an advantageous embodiment, the method is characterized in that a change of the current value profile is detected if a steady rise or a steady decline is determined in the underlying measurement variables, in particular the current values, wherein a steadiness is detected if a plurality of, in particular 4, rising or declining measurement variables in a directly successive time sequence are determined.

This is understood to mean for example that a robust and early detection of a change of the current value profile is carried out by means of an analysis of the adjacency relationships between the measured digital data points of the motor current. The motor current enables the estimation and/or calculation of the present output torque; therefore the current values are selected as specific parameters of an activation. A change of the current value profile should be rapidly and reliably detected as such. A positive change (rise) as well as a negative change (decline) of the current value profile is possible here. A steady rise or decline is assumed to be reliable, i.e. the estimate is assumed to be robust if the current at a plurality of, in particular at least four, successive points rises or declines steadily. If a measurement is carried out every 5 milliseconds, a change of the current value profile can be advantageously identified in a time period of 20 milliseconds with high confidence for a valid detection.

The condition for a steady rise (1) or decline (2) is as follows.

$$i(k)>i(k-1)>i(k-2)>i(k-3) \quad \text{Condition 1}$$

$$i(k)<i(k-1)<i(k-2)<i(k-3) \quad \text{Condition 2}$$

In an advantageous development, the method is characterized in that a change of the current value profile is detected if a steady and sufficient rise or decline of the underlying measurement variables is determined, wherein a sufficient rise or decline is detected if a plurality of, in particular 3, rising difference amounts (d1, d2, d3)—of the measurement variables in a directly successive time sequence for an activation of the parking brake actuator (2)—are determined, or if a plurality of, in particular 3, difference amounts (d1, d2, d3) of the measurement variables in a directly successive time sequence each lie above a threshold value (a, b, c) that is associated with the difference amount (d1, d2, d3), wherein the threshold values (a, b, c) are equal or there is a steady rise of the threshold values (a, b, c) corresponding to the chronological order of the associated difference amounts (d1, d2, d3).

It is understood here that, for example, a change of the current value profile is identified if a steady and sufficient rise of the current values is determined. Regarding the steadiness, reference is made to conditions 1 and 2. A sufficient rise or decline is detected if a plurality of, in particular 3, rising difference amounts—of the current values in a directly successive time sequence for an activation of the parking brake actuator—are determined. The following are defined as difference amounts:

$$d1=i(k-2)-i(k-3); \ d2=i(k-1)-i(k-2); \ d3=i(k)-i(k-1)$$

$$d1<d2<d3 \quad \text{Condition 3}$$

In an alternative embodiment, a sufficient rise is detected if a plurality of, in particular 3, difference amounts—of the current values in a directly successive time sequence for an activation of the parking brake actuator—each lies above a threshold value associated with the difference amount, wherein the threshold values are equal or there is a steady rise in the threshold values corresponding to the chronological order of the associated difference amounts.

$$d1>a \text{ AND } d2>b \text{ AND } d3>c \quad \text{Condition 3}$$

with a<=b<=c

Wherein a "=" shall be interpreted as a linear rise of the force or of the current and "<" shall be interpreted as a progressive rise of the force or of the current.

Typical values for the threshold values a, b, c for a positive current change are:
a=0.1 to 1 A
b=0.2 to 1 A
c=0.3 to 1 A Typical values for the threshold values a, b, c for a negative current change are:
a=−1 to −0.3 A
b=−1 to −0.2 A
c=−1 to −0.1 A The elements a, b, c are to be understood as threshold values here that can be adapted to the existing brake system or the respective component behavior. When selecting the parameters, the following relationship applies: the smaller the values of a, b, c, the more sensitive is the detection; the smaller the values of a, b, c the more vulnerable is the detection to interference.

In one advantageous development, the method is characterized in that during an analysis of the measurement variables, in particular the current values, defined measurement variables are not taken into account, wherein in particular measurement variables of a switch-on peak are not taken into account, wherein not taking variables into account is enabled by means of a time factor, in particular such that no measurement values of the first 10 ms of the switch-on process are taken into account, and/or are enabled by a quantitative factor, in particular such that no measurement values are taken into account that lie above a defined level.

It is understood here that the initial switch-on peak of the motor current is not taken into account. The switch-on peak comprises brief high current values. However, in order to not erroneously conclude that there is local damage, said values can be excluded during the analysis. For example, current values from a certain level point to a switch-on peak can accordingly be discounted from said current value level. As the switch-on peak occurs during the switch-on process, it is also possible to discount the current values of a first time interval, in particular the first 10 milliseconds, during the analysis. Alternatively, said current values are not collected at all.

In an alternative advantageous embodiment of the method, it is provided that the variable representing the output torque of the parking brake actuator is determined on the basis of a rotation rate of the parking brake actuator, wherein damage to the parking brake is detected if a change of a profile of the rotation rate is determined, in particular if a reduction of the rotation rate followed by a rise of the rotation rate is determined.

It is understood here that the determination of defects can also be carried out on the basis of the rotation rate of the parking brake actuator. The variable representing the output torque of the parking brake actuator constitutes the rotation rate here, in particular the profile of the rotation rate. The determined revolution rate of the parking brake actuator per unit time is understood as the rotation rate. As an electric motor is often used as a parking brake actuator for a parking brake, the revolution rate of the parking brake actuator can be the revolution rate of the electric motor. A rise of the output torque results in this case in a reduction of the rotation rate. A reduction of the output torque by contrast results in a rise of the rotation rate. Surprisingly, it has been determined that said relationship can be used for determining defects. The method for determining defects on the basis of a variable representing the output torque can therefore either be carried out on the basis of the current value of the parking brake actuator or alternatively on the basis of the rotation rate of the parking brake actuator. In an alternative embodiment, a combination of the rotation rate and the current value can also be used. This advantageously enables the validity of the quality of the result to be enhanced for example.

Furthermore, it is advantageously provided that the embodiments of the method previously described—in relation to the basis of the current value profile—are also used in an analogous manner as advantageous embodiments of a method on the basis of the rotation rate. An example of this is the determination of a steady and/or sufficient rise or decline of measurement variables, wherein in this case the revolution rate or rotation rate of the parking brake actuator is taken into account as a measurement variable.

In an advantageous embodiment, the method is characterized in that the time profile of the variable representing the output torque of the parking brake actuator is analyzed for determining the damage to the parking brake, wherein the number of detected bindings is analyzed and/or wherein the time separation of detected bindings is analyzed.

It is understood here that the method also analyzes the profile of a variable representing the output torque of the parking brake actuator in order to obtain further information regarding possible damage. An association of a detected anomaly with a specific component can be carried out here. A classification of the damage can advantageously be derived from the time profile of the determined variable. With the described method, a local defect can be determined on the stops of the spindle nut, or the stop of the spindle, the threaded spindle itself or the gearbox parts on the automated parking brake. By means of the time separation of the local binding and a known rotation rate of the electric motor, it can further be concluded whether the binding occurs once per rotation of the spindle or occasionally. By means of the method, the defect can be detected from any spindle position and for any activation (release, application, full release for lining replacement, recalibration). For example, a defect of the nut-spindle system is concluded owing to a single occurrence, or depending on the gradient of the spindle a two-time occurrence, of a detected binding per rotation of the spindle (in an alternative embodiment, per activation process of the parking brake).

Furthermore, in the event of a plurality of bindings it is concluded that there is a defect of the reduction gearbox.

Of course, the severity of the form of the damage can also be concluded owing to the determined data, for example from the degree of variation of the variable representing the output torque.

In a further advantageous embodiment, the method is characterized in that information is obtained, in particular information of a driver of the motor vehicle regarding determined damage of the parking brake.

It is understood here that the method not only detects damage, but said information is also processed further. For this purpose, for example active forwarding of the information can be provided by means of a warning or a notice to the driver. One such warning or notice can for example be carried out as a warning symbol or text element in the instrument cluster. In an additional or alternative embodiment, the information can also be stored and the dissemination of detailed information can be provided by reading from an error memory.

According to the disclosure, a control unit for a motor vehicle with an automated parking brake is provided, wherein the parking brake comprises a parking brake actuator that can be activated for the generation of a clamping force and/or for securing the generated clamping force, and wherein the control unit is characterized in that the control unit comprises means for and is arranged for identifying damage to the parking brake, wherein the identification is carried out on the basis of a time profile of a variable representing the output torque of the parking brake actuator.

It is understood here that a control unit and/or any other computing unit is provided for the motor vehicle that is designed to, i.e. is arranged to and/or comprises means to, carry out or support a method—as previously described.

According to the disclosure, an automated parking brake for a motor vehicle is further provided, wherein the parking brake comprises a parking brake actuator that can be activated for the generation of a clamping force and/or for securing the generated clamping force, and wherein the automated parking brake is characterized in that the parking brake comprises means to and is designed to identify damage to the parking brake, wherein the identification is carried out on the basis of a time profile of a variable representing the output torque of the parking brake actuator.

It is understood here that a parking brake is provided for the motor vehicle that is designed to, i.e. is arranged to and/or comprises means to, carry out or support a method—as previously described.

Further features and functionality of the disclosure arise from the description of exemplary embodiments using the accompanying figures.

DETAILED DESCRIPTION

Figure 1:
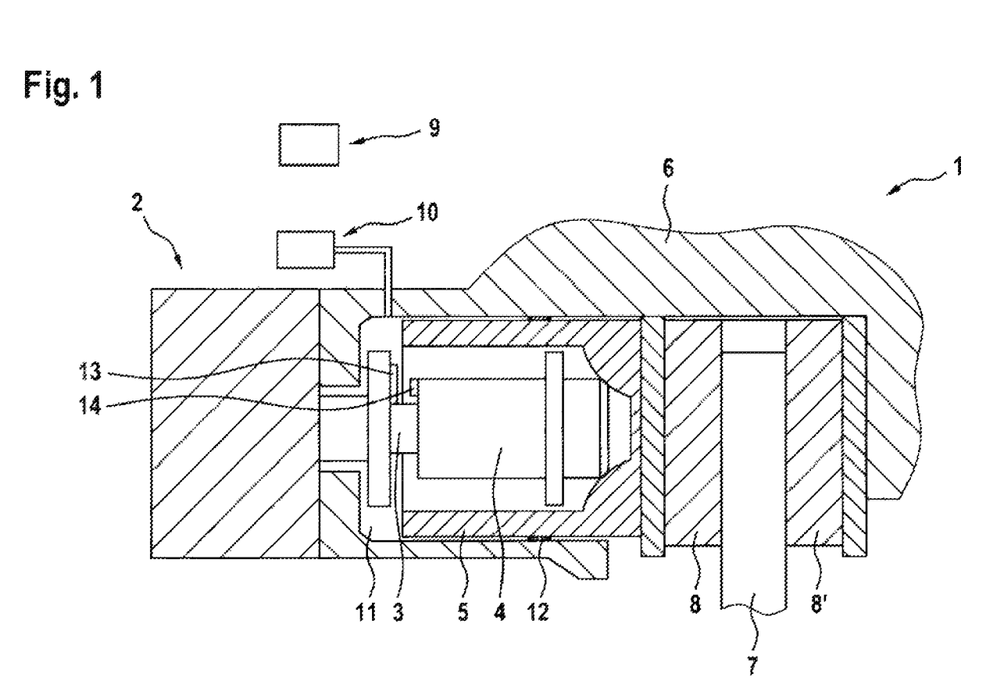
FIG. 1 shows a schematic sectional view of a brake device with a service brake and an automated parking brake in a "motor on caliper" design.

FIG. 1 shows a schematic sectional view of a brake device 1 for a vehicle. The brake device 1 comprises in this case an automated (automatic) parking brake, which can exert a clamping force for holding the vehicle stationary by means of an actuator 2 (brake motor), which in the present case is in the form of a d.c. motor. The actuator 2 of the parking brake drives a spindle 3 that is supported in an axial direction, in particular a threaded spindle 3, for this purpose. On the end thereof that is remote from the actuator 2, the spindle 3 is provided with a spindle nut 4 that is in contact with a brake piston 5 in the applied state of the automated parking brake. The parking brake electromechanically transfers a force to brake linings 8, 8' and a brake disk (7) in this way. The spindle nut is in contact with an inner end face of the brake piston 5 during this. The spindle nut 4 and the brake piston 5 are supported in a brake caliper 6 that engages around the brake disk 7 as jaws. As illustrated, the automated parking brake is for example in the form of a "motor on caliper" system and is combined with the service brake or integrated within a service brake. The service brake comprises a separate actuator 10 for performing the regular service braking. The service brake in FIG. 1 is designed as a hydraulic system, wherein the actuator 10 is represented for example by a brake booster or an ESP pump. For building up a braking force by means of the hydraulic service brake, a medium 11 is compressed in a fluid chamber that is bounded by the brake piston 5 and the brake caliper 6. The brake piston 5 is sealed relative to the surroundings by means of a piston sealing ring 12.

The illustrated spindle nut 4 comprises a mechanical rotary end stop represented by a spindle nut stop 14. A spindle stop 13 is also formed on the spindle 3 as a counterpiece. Such an end stop is required so that the spindle nut 4 is not axially braced on the spindle 3 in the end position. Said axial bracing could result in the drive torque not being sufficient in the reverse direction (i.e. in the direction of engaging the parking brake) and hence in the spindle nut remaining locked in the end position thereof.

The activation of the brake actuators 2 and 10 is carried out by means of an end stage, i.e. by means of a control unit 9 that can be for example a control unit of a vehicle dynamics system, such as an ESP (electronic stability program) or any other control unit. FIG. 1 shows the state in which the free travel and air gap have already been overcome.

Figure 2A:
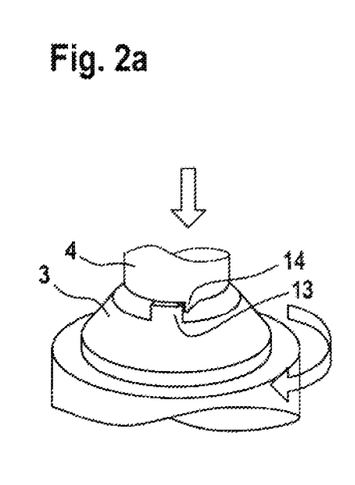
FIG. 2a-c shows a representation of the displacement of the spindle stop and of the spindle nut stop in the profile of a revolution.
Figure 2B:
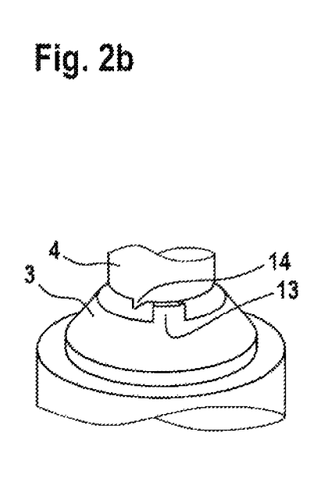
Figure 2C:
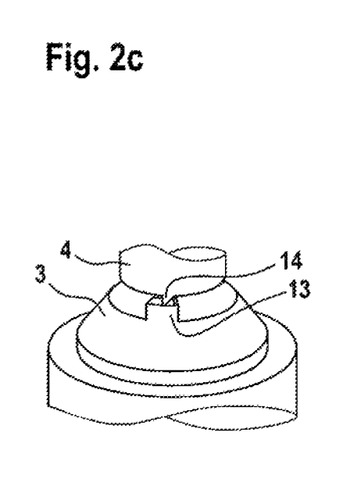

FIGS. 2a, 2b and 2c show a representation of the displacement of the spindle stop 13 and of the spindle nut stop 14 in the profile of a revolution of the spindle 3. Possible damage to the end stop 13, 14 is illustrated using said representations. FIG. 2a shows the spindle nut 4 and the spindle 3 in the end stop, in which the spindle stop 13 and the spindle nut stop 14 are in contact with each other. FIG. 2b shows the position of the two stops 13 and 14 following an incomplete revolution. FIG. 2c shows the position of the two stops 13, 14 following an almost complete revolution. Owing to the illustrated deformation of the stops 13, 14, the position of the stops 13, 14 illustrated in FIG. 2c results in contact between the stops, which is associated with a rise in the drive torque. The end stops 13, 14 are designed for a defined number of contacts. If said number is exceeded, a defect can occur. Damage can already be identified in advance. The damage is local binding of the threaded spindle. Said damage is caused by a plastic deformation of the spindle 3 and/or the spindle nut 4. During this a type of "whisker" (plastic deformation) forms on the radial stop 13 of the spindle 3 and/or on the radial stop 14 of the spindle nut 4. After about one rotation of the spindle, measured from the "end stop" starting point, the two stops 13, 14 are traversed. Owing to the deformation of the stops 13, 14, there is mechanical contact and a temporary rise of the drive torque of the electric motor 2 of the parking brake. This results in a brief increase in current, which can be measured by means of the current measurement system of the parking brake electronics. The increase in current is exhibited by a rise in the current with a fall following shortly thereafter. Such a characteristic shape of the current curve must be robustly detected in order to be able to make a valid statement about possible damage to the parking brake.

Figure 3A:
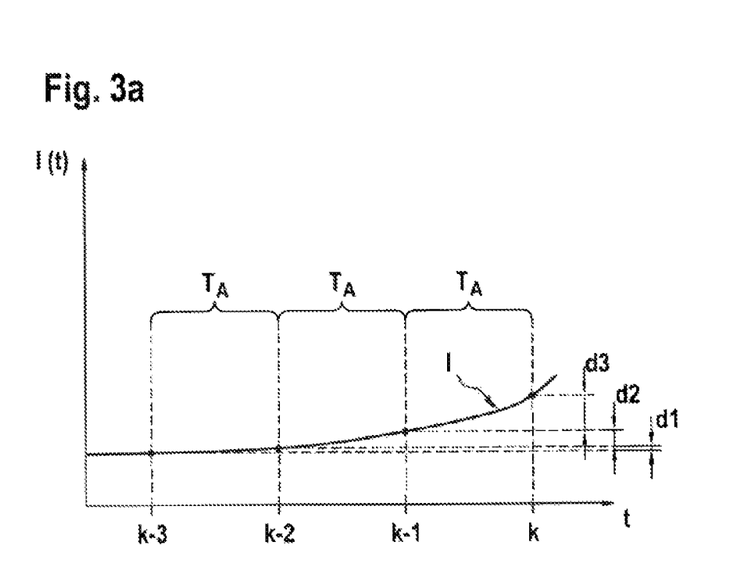
FIG. 3a, 3b shows an idealized profile of a motor current against time for a rise or a decline of the motor torque as well as the adjacency relationships of the measurement points.
Figure 3B:
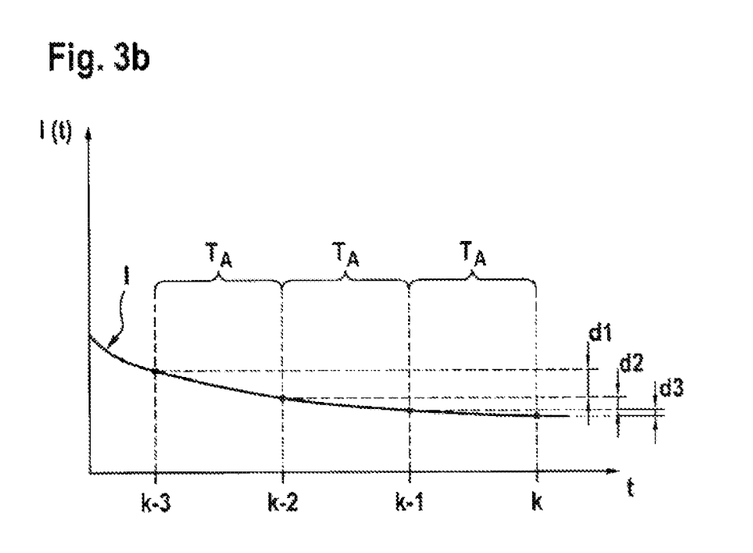

FIG. 3a shows a current profile I against time t, such as arises for example as a result of an increase in the drive torque of the electric motor 2 of the parking brake (also known as the motor torque $M_{Mot}$). The current profile I as well as the motor torque $M_{Mot}$ are represented in a schematically idealized manner. Furthermore, the measurement points k−3, k−2, k−1, k are also shown. The measurement of the data points is carried out in each case with an equidistant time interval $T_A$ between the measurement points. Moreover, FIG. 3a illustrates the difference d of the current values I that exists between two adjacent measurement points. For this purpose, the current value differences d1, d2, d3 are shown. For example, a change current value change can be detected if a steady rise of the underlying measurement variables, i.e. the current values, is determined, wherein a steadiness is detected if a plurality of, for example 4, rising measurement variables can be determined in a directly successive time sequence. FIG. 3a illustrates the representation of a rising current profile I against time, wherein of course said profile can and will also be used in an analogous way for a declining current profile I. FIG. 3b shows in an analogous way a current profile I against time t, such as for example arises as a result of a reduction of the drive torque of the electric motor 2 of the parking brake.

Figure 4:
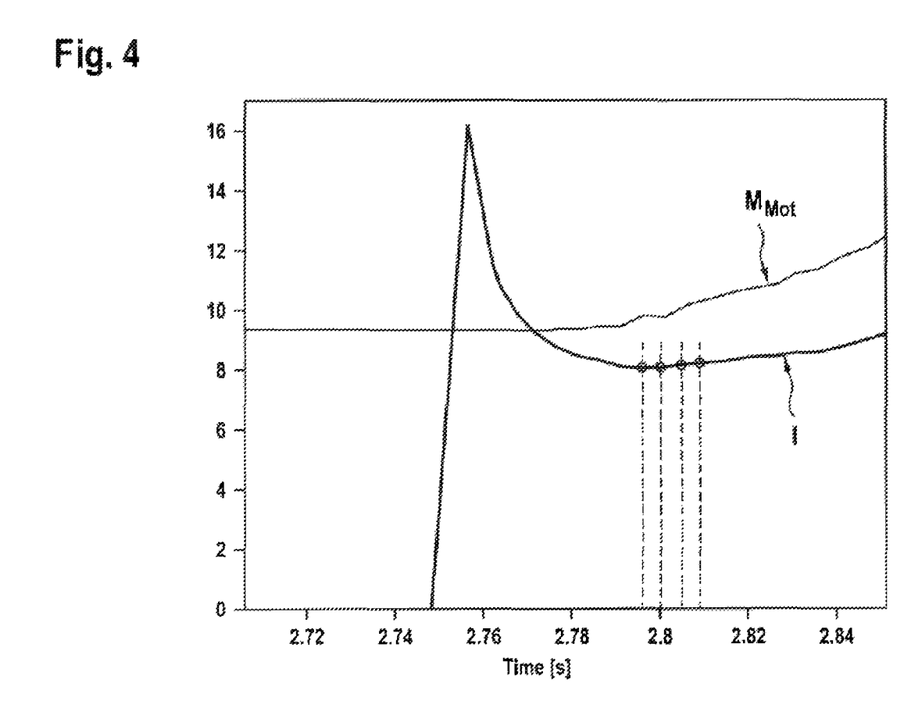
FIG. 4 shows a general profile of the motor current for a rise of the motor torque against time as well as measurement points with rising current value.

The representation depicted in FIG. 4 shows the identification of the increase in the motor torque based on rising current values, and should contribute in particular to a suitable understanding of the components of the disclosure.

FIG. 4 shows an exemplary profile of the motor current I for a rise of the motor torque $M_{Mot}$ against time as well as measurement points with rising current values. The profile of the motor current shows first a switch-on peak, which is caused for example by the initial or further switch-on of the electric motor of the automated parking brake. The representation in FIG. 4 shows by way of example a so-called "reclamping", i.e. a further clamping process for an already activated parking brake. The motor torque $M_{Mot}$ therefore already markedly lies in the positive region on activation of the parking brake actuator. Owing to the re-activation of the parking brake actuator, in this case a motor torque $M_{Mot}$ is built up immediately. This can be seen in the illustrated profile of the motor torque $M_{Mot}$. In parallel with this, an increase of the motor current I also takes place. For the identification of an increase of the motor torque, the condition of four successively occurring rising current values can be used for example. Said measurement points are sketched in FIG. 4. A sampling time of 5 milliseconds was selected for this.

The method according to the disclosure can of course be carried out with any activation of the parking brake. A clamping process of an automated parking brake is represented in FIG. 5 as well as FIG. 6 and FIG. 7 by way of example.

Figure 5:
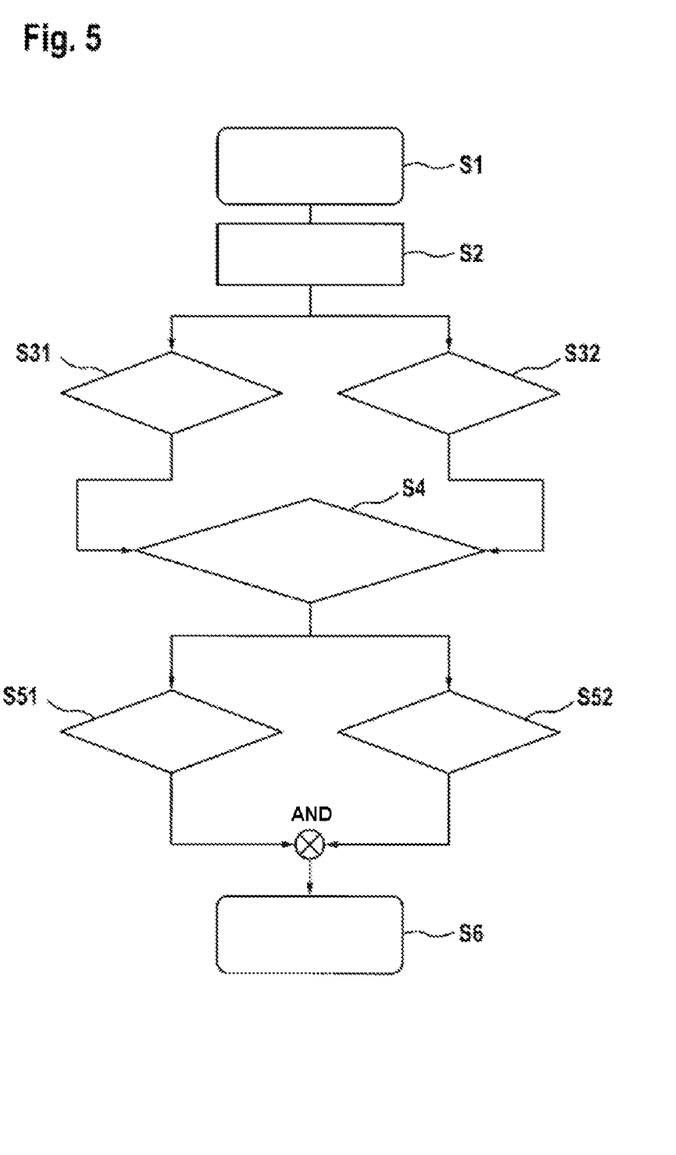
FIG. 5 shows a flow chart of a damage check of a parking brake.

FIG. 5 shows an exemplary flow chart of a damage check of the parking brake in order to detect damage to the parking brake. Within the scope of the method, it is in particular necessary that a positive current change is detected followed by a negative current change. The method starts with the "start of the clamping process" in a step S1. In a step S2, the current profile is determined continuously, for example by a measurement or an estimation of the current values. The determined current values are temporarily stored in a memory. A current change is identified based on the determined current values. A positive current change is determined in a step S31 or a negative current change is determined in a step S32. For the determination of current changes, for example the method illustrated in FIG. 3, the conditions thereof can be used, both for a positive current change and also analogously for a negative current change. The current changes are also temporarily stored in a memory. In a further step S4, it is determined whether a negative current change follows a positive current change. Then in a step S51 the time t between the change from the positive current change to the negative current change is analyzed. Here it is provided as a condition that the time t between the positive and the negative current changes is to lie within a defined time period $t_D$, i.e. the time between the positive and negative current changes is to be less than a defined maximum time $t_D$. In a further step S52, the voltage change $U_D$ is analyzed. Here it is provided as a condition that the voltage change $U_D$ for a positive current change lies within a defined interval $\Delta U$, i.e. the increase in the voltage for the current change is less than a defined value $\Delta U$. If the conditions of the steps S51 and S52 in the illustrated exemplary embodiment are represented by means of an "AND" combination, there is an explicit reference to the fact that the method can also advantageously provide an "OR" combination. In summary, the exemplary procedure can be described as follows: it is concluded that there is damage if the motor current first increases (positive change), then the motor current decreases again (negative change) and the time between the positive and negative current change lies within a defined time period $t_D$ and the voltage $U_D$ for a current increase does not increase by more than a defined voltage limit $\Delta U$ for a voltage change. Typical values for $t_D$ here are 0.01 seconds to 0.1 seconds. Typical values for are 0.1 Volts to 2 Volts.

Figure 6:
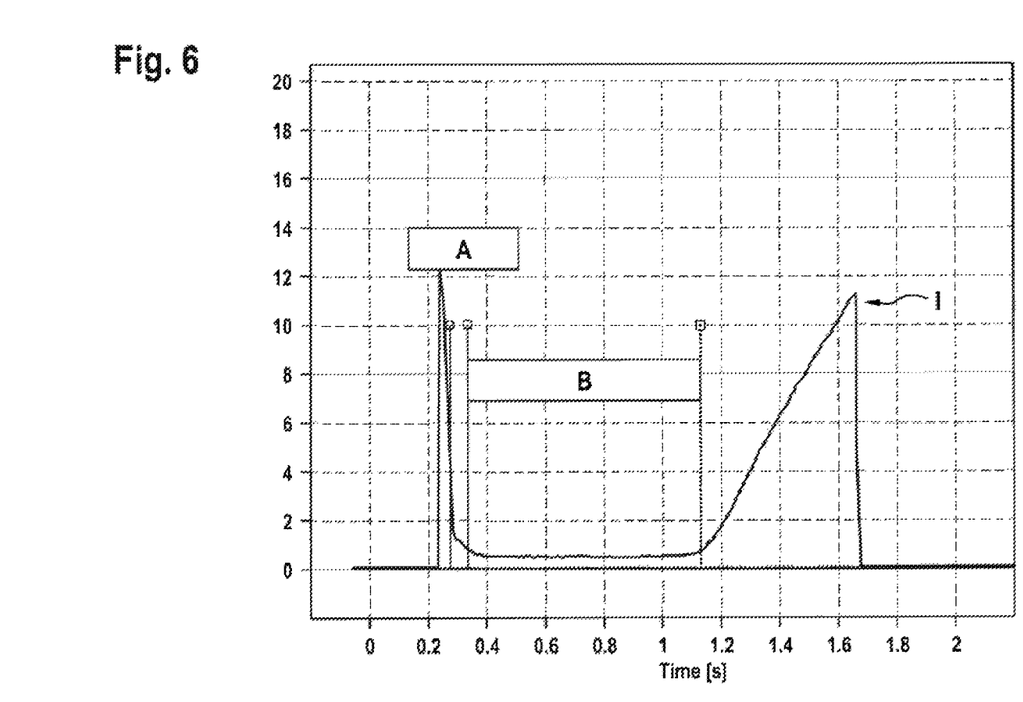
FIG. 6 shows a profile of the motor current as well as identified negative and positive current changes for a parking brake without damage.

FIG. 6 shows a profile of the motor current I as well as identified negative and positive current changes for a parking brake without damage. The description of the regular "good case" (normal situation) should serve to clarify the operation of the method. The simulation illustrated in FIG. 6 shows the measurement data of the motor current I and the detection points in time of the algorithm for current changes. Furthermore, negative current changes (by means of round markers) and positive current changes (by means of square markers) are shown by way of example. The algorithm is used on all of the measured current measurement points. Two case examples are illustrated. Case example A: during motor run-up, two successive negative current changes are detected. This is the case because the current curve comprises a slightly positive profile owing to further loads being switched on. The criterion for detecting damage is not met because a negative change follows a negative change. Case example B: here a positive current change follows a negative change. The condition ("negative current change to positive current change") for the detection of damage is not met. Moreover, between the two detection points there is a time period of greater than $t_D$ (with the assumption of $t_D$ between 0.01 and 0.1 seconds).

Figure 7:
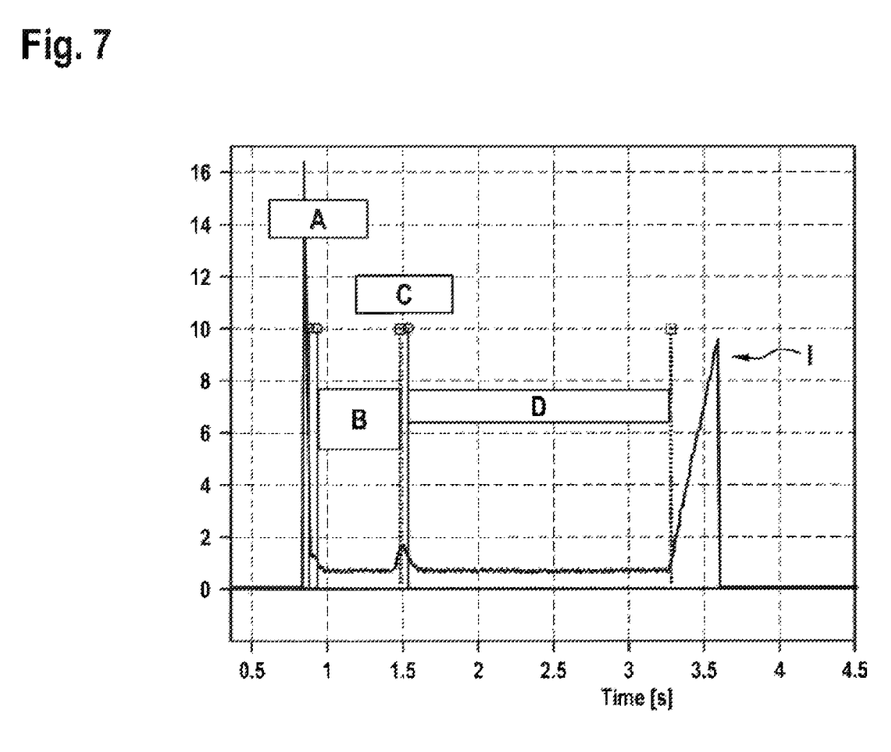
FIG. 7 shows a profile of the motor current as well as identified negative and positive current changes for a parking brake with damage.

FIG. 7 shows a profile of the motor current I as well as identified negative and positive current changes for a parking brake without damage. The description of the "error case" (detection situation) should further clarify the operation of the proposed method. The representation shows a damaged actuator that is carrying out a clamping process. The defect is not yet great enough to significantly adversely affect the operation of the parking brake. However, such a defect is magnified by operation of the parking brake. This can result in the parking brake failing. Case example A: here no detection of damage takes place (see remarks for case example A FIG. 6). Case example B: here no detection of damage takes place (see remarks for case example B FIG. 6). Case example C: here a detection of damage does take place. The damage is detected because all criteria that are necessary for detection are fulfilled. This enables a timely repair of the system to be carried out for example. Case example D: here no detection of damage takes place (see remarks for case example B FIG. 6).

What is claimed is:

1. A method for determining defects of an automated parking brake for a motor vehicle with at least one brake device, comprising:
   operating, with a control unit, an actuator to rotate a spindle that engages a spindle nut to move a brake lining toward a brake disk or away from the brake disk while the brake lining is not in contact with the brake disk;
   measuring, with the control unit, a profile of a current that is supplied to the actuator over a predetermined time period during the operating of the actuator; and
   identifying, with the control unit, that at least one of the spindle and the spindle nut is damaged in response to the profile of the current including a positive change in current amplitude followed by a negative change in the current amplitude during the predetermined time period.

2. The method of claim 1 further comprising:
   measuring, with the control unit, a profile of a voltage that is supplied to the actuator over the predetermined time period during the operating of the actuator; and
   identifying, with the control unit, that at least one of the spindle and the spindle nut in the automated parking brake is damaged in response to the profile of the current including the positive change in current amplitude followed by the negative change in the current amplitude during the predetermined time period and the profile of the voltage including an increase in voltage level that does not exceed a predetermined voltage limit during the predetermined time period.

3. A method for determining defects of an automated parking brake for a motor vehicle with at least one brake device, comprising:
   operating, with a control unit, an actuator to rotate a spindle that engages a spindle nut to move a brake lining toward a brake disk or away from the brake disk while the brake lining is not in contact with the brake disk;
   measuring, with the control unit, a profile of a rotational rate of the actuator over a predetermined time period during the operating of the actuator; and
   identifying, with the control unit, that at least one of the spindle and the spindle nut is damaged in response to the profile of the rotational rate including a reduction in the rotational rate of the actuator followed by an increase in the rotational rate of the actuator during the predetermined time period.

4. An automated parking brake for a motor vehicle, comprising:
   an actuator configured to rotate a spindle that engages a spindle nut to move a brake lining toward a brake disk or away from the brake disk; and a control unit operatively connected to the actuator, the control unit being configured to:
- operate the actuator to move the brake lining toward the brake disk or away from the brake disk while the brake lining is not in contact with the brake disk;
- measure a profile of a current that is supplied to the actuator over a predetermined time period during the operating of the actuator; and
- identify that at least one of the spindle and the spindle nut is damaged in response to the profile of the current including a positive change in current amplitude followed by a negative change in the current amplitude during the predetermined time period.

5. The automated parking brake of claim 4, the control unit being further configured to:
- measure a profile of a voltage that is supplied to the actuator over the predetermined time period during the operating of the actuator; and
- identify that at least one of the spindle and the spindle nut in the automated parking brake is damaged in response to the profile of the current including the positive change in current amplitude followed by the negative change in the current amplitude during the predetermined time period and the profile of the voltage including an increase in voltage level that does not exceed a predetermined voltage limit during the predetermined time period.

* * * * *